United States Patent
Burke

(10) Patent No.: US 6,819,010 B2
(45) Date of Patent: Nov. 16, 2004

(54) VEHICLE WITH SWITCHED SUPPLEMENTAL ENERGY STORAGE SYSTEM FOR ENGINE CRANKING

(75) Inventor: James O. Burke, Richmond, IL (US)

(73) Assignee: Kold Ban International, Ltd., Lake in the Hills, IL (US)

( * ) Notice: Subject to any disclaimer, the term of this patent is extended or adjusted under 35 U.S.C. 154(b) by 274 days.

(21) Appl. No.: 09/802,284

(22) Filed: Mar. 8, 2001

(65) Prior Publication Data

US 2003/0222501 A1 Dec. 4, 2003

(51) Int. Cl.$^7$ .................................................. H02J 7/00
(52) U.S. Cl. .................. 307/10.6; 290/38 R; 123/179.1
(58) Field of Search ................................ 309/9.1, 10.1, 309/10.6, 10.7; 290/7, 27, 38 R, 33; 180/65.1, 65.3, 65.4; 123/179.1

(56) References Cited

U.S. PATENT DOCUMENTS

| | | |
|---|---|---|
| 2,659,042 A | 11/1953 | Anderson et al. |
| 3,638,108 A | 1/1972 | Channing |
| 3,942,027 A | 3/1976 | Fima |
| 4,161,682 A | 7/1979 | Corvette |
| 4,488,147 A | 12/1984 | Signorile |
| 4,492,162 A | 1/1985 | Nettesheim et al. |
| 4,492,912 A | 1/1985 | Nowakowski |
| 4,494,162 A | 1/1985 | Eyler |
| 4,510,431 A | 4/1985 | Winkler |
| 4,540,929 A | 8/1985 | Binkley |
| 4,727,306 A | 2/1988 | Misak et al. |
| 4,857,820 A | 8/1989 | Tompkins et al. |
| 4,902,955 A | 2/1990 | Manis et al. |
| 5,039,930 A | 8/1991 | Collier et al. |
| 5,077,513 A | 12/1991 | Dea et al. |
| 5,146,095 A * | 9/1992 | Tsuchiya et al. .......... 290/38 R |
| 5,155,373 A | 10/1992 | Tsuchiya et al. |
| 5,157,267 A * | 10/1992 | Shirata et al. ............. 307/10.1 |
| H1172 H | 4/1993 | Gorniak |
| 5,207,194 A * | 5/1993 | Clerici ...................... 290/38 R |
| 5,260,637 A | 11/1993 | Pizzi |
| 5,321,389 A | 6/1994 | Meister |
| 5,371,455 A | 12/1994 | Chen |
| 5,563,454 A * | 10/1996 | Araki et al. ............... 307/10.6 |
| 5,589,292 A | 12/1996 | Rozon |
| 5,637,978 A | 6/1997 | Kellet et al. |
| 5,642,696 A | 7/1997 | Matsui |
| 5,783,872 A | 7/1998 | Blair |

(List continued on next page.)

FOREIGN PATENT DOCUMENTS

JP  2-175351  7/1990

OTHER PUBLICATIONS

U.S patent application Ser. No. 09/652,686, filed Aug. 31, 2000, Inventor: Burke.

(List continued on next page.)

*Primary Examiner*—Stephen W. Jackson
*Assistant Examiner*—Roberto J. Rios
(74) *Attorney, Agent, or Firm*—Brinks Hofer Gilson & Lione

(57) ABSTRACT

A vehicle having an internal combustion engine, a cranking motor, and a battery includes a double-layer capacitor characterized by a capacitance greater than 150 farads, and a low internal resistance. First and second electrical paths interconnect the capacitor with the cranking motor. A control circuit is coupled between the positive and negative terminals of the capacitor, and this control circuit includes a switch that applies a variable control voltage to a relay in response to the position of the switch. The relay is included in one of the electrical paths, and the relay isolates the capacitor from the cranking motor when switched to the open-circuit condition by the control voltage and enables the capacitor to supply cranking current to the cranking motor when the control voltage places the relay in the closed-circuit condition.

16 Claims, 2 Drawing Sheets

U.S. PATENT DOCUMENTS

| | | | |
|---|---|---|---|
| 5,793,185 | A | 8/1998 | Prelec et al. |
| 5,818,115 | A * | 10/1998 | Nagao ..................... 290/38 R |
| 5,925,938 | A | 7/1999 | Tamor |
| 5,963,417 | A | 10/1999 | Anderson et al. |
| 5,998,961 | A | 12/1999 | Brown |
| 6,018,199 | A | 1/2000 | Shiroyama et al. |
| 6,034,492 | A | 3/2000 | Saito et al. |
| 6,057,667 | A | 5/2000 | Mills |
| 6,075,331 | A | 6/2000 | Ando et al. |
| 6,130,519 | A | 10/2000 | Whiting et al. |
| 6,133,645 | A | 10/2000 | Scribner et al. |
| 6,160,373 | A | 12/2000 | Dunn et al. |
| 6,163,088 | A | 12/2000 | Codina et al. |
| 6,211,577 | B1 | 4/2001 | Alksnat et al. |
| 6,212,054 | B1 | 4/2001 | Chan |
| 6,222,342 | B1 | 4/2001 | Eggert et al. |
| 6,242,887 | B1 | 6/2001 | Burke |
| 6,265,851 | B1 | 7/2001 | Brien et al. |
| 6,325,035 | B1 | 12/2001 | Codina et al. |
| 6,362,595 | B1 | 3/2002 | Burke |
| 6,426,606 | B1 | 7/2002 | Purkey |
| 2001/0025618 | A1 | 10/2001 | Kelling |
| 2003/0075134 | A1 | 4/2003 | Burke |

OTHER PUBLICATIONS

U.S. patent application Ser. No. 09/838,005, filed Apr. 18, 2001, Inventor: Burke.

U.S. Provisional patent application Ser. No. 60/292,791, filed May 22, 2001, Inventor: Solberg.

Translation of Japanese Patent Application Publication No. JP 2-175351, published Jul. 6, 1990.

KBI Kapower Installation Operation Manual (KBI/Kold Ban International, Ltd. 1999).

KBI Kapower Supercapacitors (4-page Brochure KBI/Kold Ban International, Ltd. 1999).

Charge All Wheel Type Battery Chargers (Model 13-012 Boost All, Good All Mfg. 1999).

The Intra Switch, Intra USA 1998.

Battery Optimizer, Purkay's Fleet Electric Inc. 1999.

Low Voltage Disconnects Switches and Alarms, Sure Power Industries Inc. 1998.

Miller et al., SAE Technical Paper Series 982794 entitled "Truck Starting Using Electrochemical Capacitors," copyrighted 1998, pp. 1–7.

Miller, John R., "Engineering Battery Capacitor Combinations in High Power Applications: Diesel Engine Starting," presented at "The $9^{th}$ International Seminar on Double Layer Capacitors and Similar Energy Storage Devices", Deerfield Beach, Florida, pp. 1–11, Dec. 6–8, 1999.

KBi KAPower "Installation–Operation Manual," KBi/Kold– Ban International, Ltd., KBi Form #131137 Rev. 06/00, pp. 1–11, 2000.

KBi, "KBi Kranking Kap Super Capacitors", KBi Publication, 2000, 2 pages.

"KAPower Super Capacitors", Kold–Ban International, Ltd., brochures, pp. 1–4, 2000.

KBi, "KrankingKart Professional Jump–Start Unit", obtained at the internet address: http://www.koldban.com/mainpages/karts.htm, Aug. 30, 2001, 3 pages.

Capacitor Log, May 15, 2000.

\* cited by examiner

VEHICLE WITH SWITCHED SUPPLEMENTAL ENERGY STORAGE SYSTEM FOR ENGINE CRANKING

BACKGROUND

The present invention relates to vehicles of the type that include an internal combustion engine, a cranking motor, and a battery normally used to power the cranking motor. In particular, this invention relates to improvements to such systems that increase of the reliability of engine starting.

A problem presently exists with vehicles such as heavy-duty trucks. Drivers may on occasion run auxiliary loads excessively when the truck engine is not running. It is not unusual for heavy-duty trucks to include televisions and other appliances, and these appliances are often used when the truck is parked with the engine off. Excessive use of such appliances can drain the vehicle batteries to the extent that it is no longer possible to start the truck engine.

The present invention solves this prior art problem in a cost-effective manner.

SUMMARY

The preferred embodiment described below supplements a conventional vehicle electrical system with a capacitor. The capacitor is protected from discharging excessively when auxiliary loads are powered, and it is used to supply a cranking current in parallel with the cranking current supplied by the vehicle battery to ensure reliable engine starting. When the vehicle engine is not running, the capacitor is isolated from the vehicle electrical system by an open-circuited relay, and this relay is controlled by a control circuit that itself draws power from the capacitor. In this way, power is always available when the capacitor is charged to close the relay when power is needed for engine cranking. This section has been provided by way of general introduction, and it is not intended to narrow the scope of the following claims.

DETAILED DESCRIPTION OF THE PREFERRED EMBODIMENTS

Figure 1:
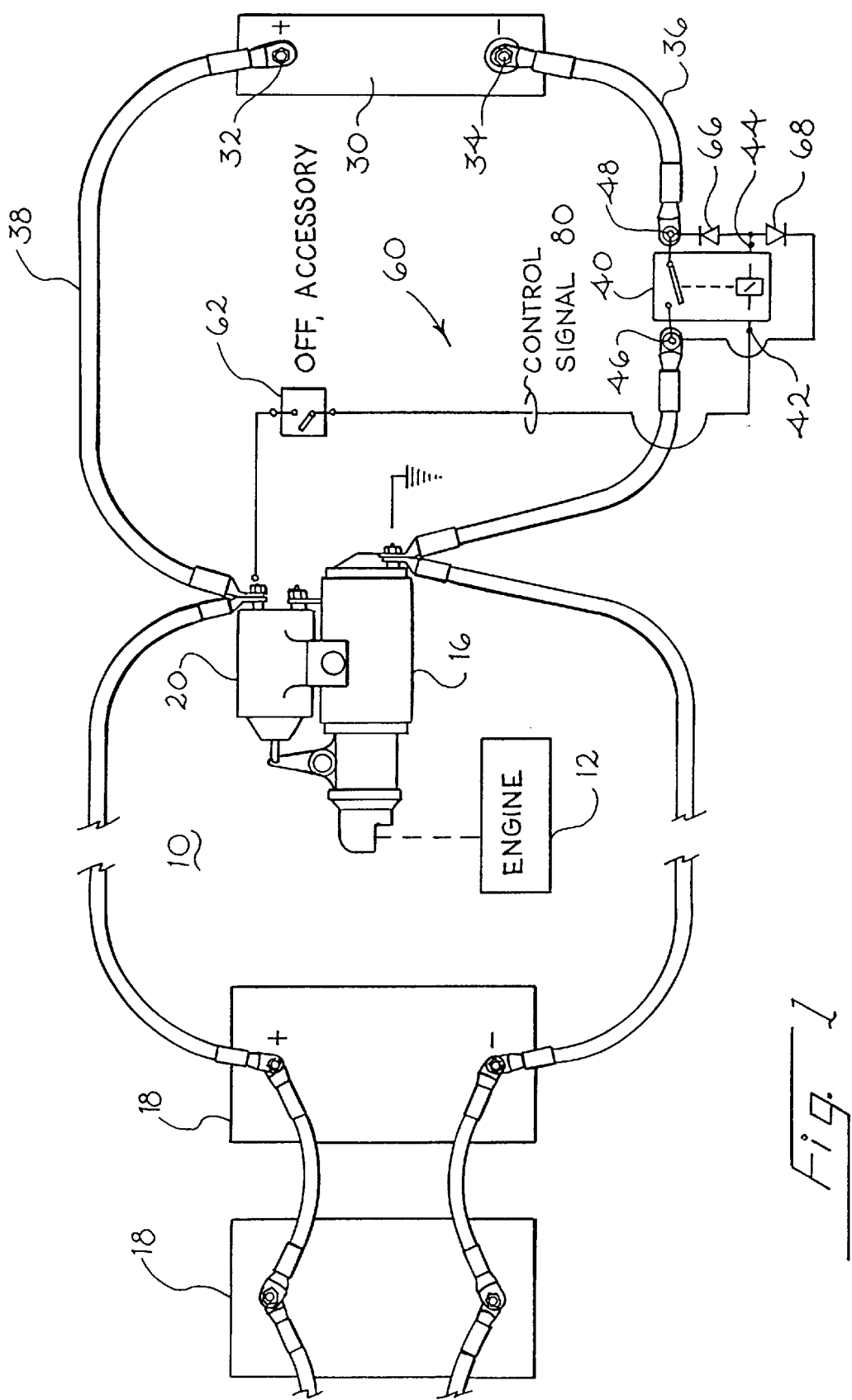
FIG. 1 is a block diagram of a vehicle electrical system that incorporates a preferred embodiment of this invention, showing a relay in an open-circuit condition.

Turning down to the drawings, FIG. 1 shows an electrical system of a vehicle 10 that includes an internal combustion engine 12. The engine 12 can take any suitable form, and may for example be a conventional diesel or gasoline engine. The engine 12 is mechanically coupled to a cranking motor 16. The cranking motor 16 can take any suitable form, and it is conventionally an electrical motor that is powered during cranking conditions by current from one or more storage batteries 18 such as conventional lead-acid batteries. Current from the batteries 18 is switched to the cranking motor 16 via a switch such as a conventional solenoid switch 20.

All of the elements 10 through 20 described above may be entirely conventional, and are well-known to those skilled in the art. The present invention is well adapted for use with the widest variety of alternative embodiments of these elements.

In addition to the conventional electrical system described above, the vehicle 10 also includes a supplemental electrical system including a capacitor 30. The capacitor 30 is preferably a double layer capacitor of the type known in the art has an electrochemical capacitor. Suitable capacitors may be obtained from KBI, Lake in the Hills, IL under the trade name KAPower. For example, in one alternative the capacitor 30 has a capacitance of 1000 farads, a stored energy capacity of 60 kilojoules, an internal resistance at −30 degrees Celsius of 0.004 ohms, and a maximum storage capacity of 17 kilowatts. In general, the capacitor should have a capacitance greater than 150 farads, and an internal resistance at 20° C. that is preferably less than 0.008 ohms, more preferably less than 0.006 ohms, and most preferably less than 0.003 ohms. The energy storage capacity is preferably greater than 15 kJ. Such capacitors provide the advantage that they deliver high currents at low temperatures and relatively low voltages because of their unusually low internal resistance. Further information about suitable capacitors for use in the system of FIG. 1 can be found in publications of ESMA, Troitsk, Moscow region, Russia and on the Internet at www.esma-cap.com.

The capacitor 30 includes a positive terminal 32 and a negative terminal 34. The positive terminal 32 is connected with the cranking motor via an electrical path 38 that includes a suitable cable and the solenoid switch 20. The negative terminal 34 is connected to the cranking motor 16 by another electrical path 36 that includes suitable cables and a relay 40. The relay 40 includes first and second control terminals 42, 44 and first and second switched terminals 46, 48. The switched terminals 46, 48 are included in the electrical path 36 such that the relay 40 interrupts the electrical path 36 when the relay is in an open-circuit condition and the relay 40 completes the electrical path 36 when the relay is in a closed-circuit condition.

The relay 40 may take many forms, and may include an electromechanical switch or a solid state switch. By way of example; a 500 amp, 12 volt electromechanical relay can be used such as that supplied by Kissling as part number 29.511.11. As an example of a suitable solid-state relay, the MOSFET switch sold by Intra USA under the trade-name Intra Switch can also be used.

The relay 40 is controlled by a control circuit 60 that is coupled between the positive and negative terminals 32, 34 of the capacitor. The control circuit 60 includes a switch 62 that is preferably the ignition switch of the vehicle. A conventional ignition switch includes four positions: accessory, off, on, start. Of course, in other embodiments, other switches can be used.

In this example, the switch 62 is connected between the positive terminal 32 and the first control terminal 42 of the relay. The second control terminal 44 of the relay is connected via a first diodes 66 to the negative terminal 34 of the capacitor 30 and via a second diode 68 to system ground. As shown in FIG. 1, the diodes 66, 68 are connected between the second control terminal 44 and the electrical path 36 on respective sides of the relay 40.

The switch 62 applies a control signal 80 to the relay 40. In this example, when the switch 62 is closed, the control signal 80 is held at a positive voltage (assuming the capacitor 30 is charged), and this positive voltage places the relay 40 in a closed-circuit condition, which places the negative terminal 34 in low-resistance contact with the cranking motor 16. Alternatively, when the switch 62 is opened, the control signal 80 is at a low voltage, and the relay 40 is in an open-circuit condition. In this condition the relay 40 interrupts the electrical path 36, thereby isolating the negative terminal 34 of the capacitor 30 from the cranking motor 16.

The operation of the system described above will be explained in conjunction with FIGS. 1 and 2. Though not shown in FIG. 1, the electrical system of the vehicle includes a conventional generator or alternator driven by the engine when running to charge both the batteries 18 and capacitor 30. Thus, the capacitor 30 is generally fully charged when the switch 62 is moved to the off or accessory position, and because the relay 40 is in the open-circuit condition, this state of charge of the capacitor 30 is preserved.

FIG. 1 shows the state of the system when the switch 62 is opened, as for example when the ignition switch of the vehicle is in the off position or the accessory position. When the switch is opened, the relay 40 is in the open-circuit condition, and the capacitor 30 is prevented from discharging. The driver of the vehicle is free to use accessory power as desired, but such usage will at most drain the batteries 18, while leaving the capacitor 30 in a full state of charge.

Figure 2:
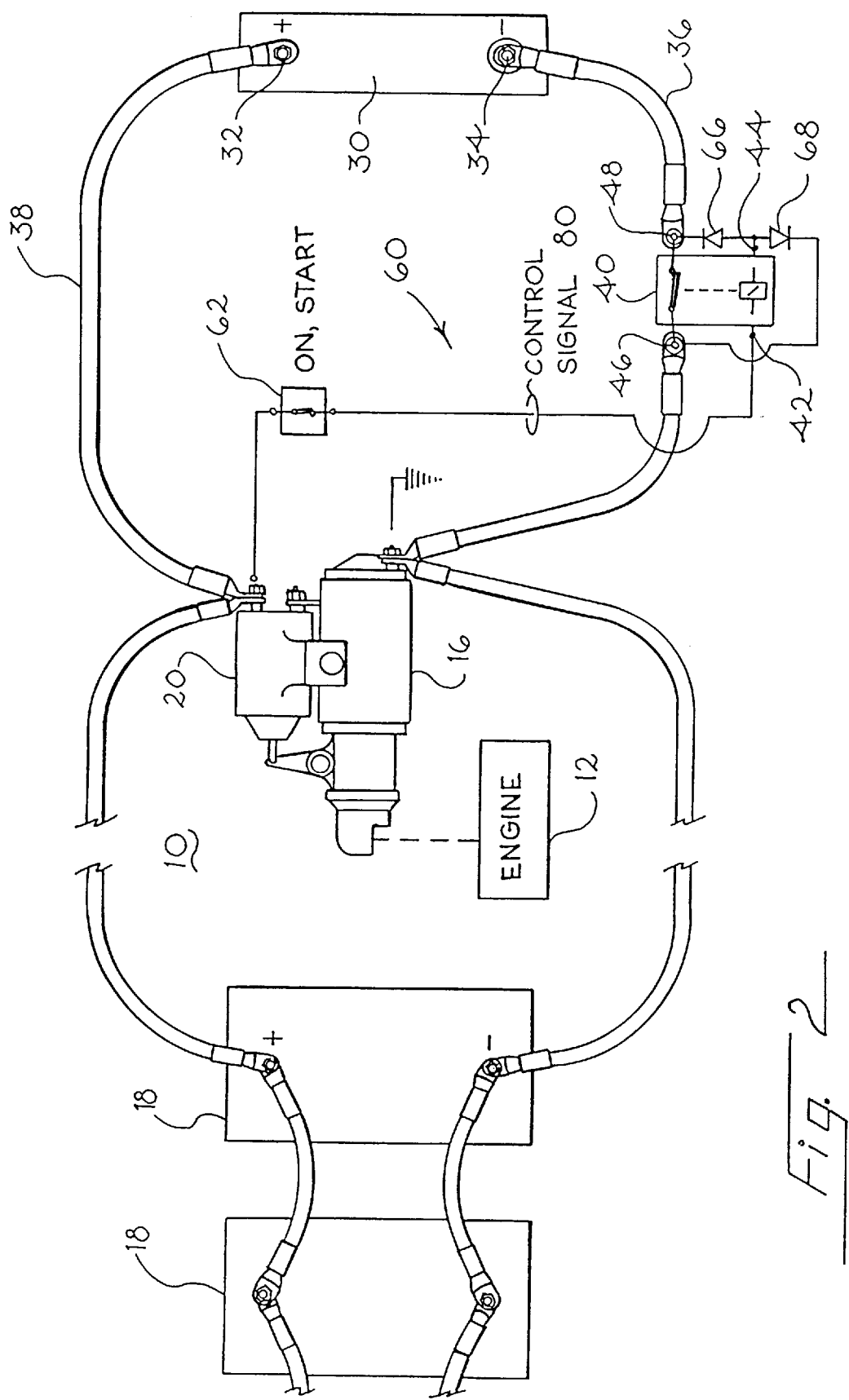
FIG. 2 is a schematic diagram of the system of FIG. 1, showing the relay in a closed-circuit condition.

FIG. 2 shows the state of the system when the switch 62 is moved is moved to the on position or the start position, thereby closing the switch 62 and placing the relay 40 in the closed-circuit condition. In this state, the relay 40 interconnects the negative terminal 34 and system ground, thereby reconnecting the capacitor 30 with the electrical system of the vehicle and making the power stored in the capacitor 30 available for use in engine cranking.

The system described above provides a number of important advantages. The supplemental electrical system including the capacitor 30 provides adequate current for reliable engine starting, even if the batteries 18 are substantially discharged by auxiliary loads when the engine 12 is not running. If desired, the supplemental electrical system including the capacitor 30 may be made invisible to the user of the vehicle. That is, the vehicle operates in the normal way, but the starting advantages provided by the capacitor 30 are obtained without any intervention on the part of the user. The capacitor is automatically disconnected from the vehicle electrical system when the vehicle is turned off, and automatically reconnected to the vehicle electrical system when the engine is started.

Additionally, the capacitor 30 provides the advantage that it can be implemented with an extremely long-life device that can be charged and discharged many times without reducing its efficiency in supplying adequate cranking current.

This system does not interfere with conventional availability of the batteries 18 to power accessories when the engine is off. This reduces the incentive of the vehicle operator to defeat the system.

The control system 60 is powered with the stored voltage on the capacitor 30. Thus, as long as the capacitor 30 includes an adequate charge to start the engine 12, it will provide an adequate voltage to close the relay 40. This is a substantial advantage, because if the control circuit 60 were connected simply between the positive terminal of the capacitor and system ground, a condition might arise in which the batteries 18 stored insufficient charge to close the relay 40, thereby preventing an operator from starting the engine 12 even though adequate charge was available in the capacitor 30.

As used herein, the term "coupled with" is intended broadly to encompass direct and indirect coupling. Thus, first and second elements are said to be coupled with one another whether or not a third, unnamed, element is interposed therebetween. For example, two elements may be coupled with one another by means of a switch.

The term "battery" is intended broadly to encompass a set of batteries including one or more batteries.

The term "set" means one or more.

The term "path" is intended broadly to include one or more elements that cooperate to provide electrical interconnection, at least at some times. Thus, a path may include one or more switches or other circuit elements in series with one or more conductors.

Of course, many alternatives are possible. For example, the relay can be placed in the electrical path that interconnects the positive terminal of the capacitor and the cranking motor or in both electrical paths that interconnect with the capacitor. Various switches and relays can be used as described above, and cables and cable terminations can be adapted as appropriate.

The foregoing description has discussed only a few of the many forms that this invention can take. For this reason, this detailed description is intended by way of illustration, not limitation. It is only the claims, including all equivalents, that are intended to define the scope of this invention.

What is claimed is:

1. In a vehicle comprising an internal combustion engine, a cranking motor coupled with the engine to crank the engine, and a battery coupled with the cranking motor, the improvement comprising:
    a capacitor comprising first and second terminals;
    first and second electrical paths interconnecting the first and second terminals, respectively, with the cranking motor;
    a control circuit coupled between the first and second terminals of the capacitor, said control circuit comprising a switch having a variable switch position, said control circuit operative to apply a control voltage at least in part from said capacitor that varies in response to the switch position of the switch; and
    a relay included in the first electrical path, said relay operative to switch in response to the control voltage applied at least in part by said capacitor between an open-circuit condition, in which the relay interrupts the first electrical path, and a closed-circuit condition.

2. The invention of claim 1 wherein the switch comprises an ignition switch of the vehicle, wherein the variable switch position comprises accessory, off, run, and start positions, and wherein the control circuit is operative (1) to place the relay in the open-circuit condition when the ignition switch is in any one of the accessory and off positions, and (2) to place the relay in the closed-circuit condition when the ignition switch is in any one of the run and start positions.

3. The invention of claim 1 wherein the switch comprises an ignition switch of the vehicle, wherein the variable switch position comprises off and start positions, and wherein the control circuit is operative (1) to place the relay in the open-circuit condition when the ignition switch is in the off position, and (2) to place the relay in the closed-circuit condition when the ignition switch is in the start position.

4. The invention of claim 1 wherein the relay comprises first and second control terminals, and wherein the control circuit comprises first and second diodes coupled between the second relay control terminal and the first electrical path on opposite sides of the relay.

5. The invention of claim 4 wherein the control circuit comprises an electrical path interconnecting the switch and the first relay control terminal.

6. The invention of claim 1 wherein said capacitor is a double layer capacitor characterized by a capacitance greater than 150 farads and an internal resistance at 20° C. less than 0.008 ohms.

7. The invention of claim 6 wherein said internal resistance of said capacitor at 1 kHz and 20° C. is less than 0.008 ohms.

8. In a vehicle comprising an internal combustion engine, a cranking motor coupled with the engine to crank the engine, and a battery coupled with the cranking motor, the improvement comprising:

a capacitor comprising first and second terminals;

first and second electrical paths interconnecting the first and second terminals, respectively, with the cranking motor;

a third electrical path interconnecting said first and second terminals;

a switch positioned in said third electrical path and moveable between at least an open position, wherein said switch interrupts said third electrical path, and a closed position, wherein said capacitor supplies a current along said third electrical path; and a relay moveable between at least an open-circuit position and a closed-circuit position, wherein said relay interrupts said second electrical path when said relay is in said open-circuit position and wherein said relay is moved to said closed-circuit position in response to said current being supplied thereto by said capacitor along said third electrical path.

9. The invention of claim 8 wherein the switch comprises an ignition switch of the vehicle, wherein the ignition switch is positionable in at least one of an accessory, off, run and start positions, and wherein said ignition switch is moveable to said open position when positioned in at least said accessory and off positions, and wherein said ignition switch is moveable to said closed position when positioned in said run and start positions.

10. In a vehicle comprising an internal combustion engine, a cranking motor coupled with the engine to crank the engine, and a battery coupled with the cranking motor, the improvement comprising:

a capacitor comprising a positive terminal and a negative terminal;

first and second electrical paths interconnecting, respectively, said positive and negative terminals with the cranking motor;

a control circuit coupled between said positive and negative terminals of the capacitor, said control circuit comprising a switch having a variable switch position, said control circuit operative to apply a control voltage that varies in response to the switch position of the switch; and a relay included in the second electrical path interconnecting said negative terminal and said cranking motor, said relay operative to switch in response to the control voltage between an open-circuit condition, in which the relay interrupts the second electrical path, and a closed-circuit condition.

11. The invention of claim 10 wherein the switch comprises an ignition switch of the vehicle, wherein the variable switch position comprises at least accessory, off, run and start positions, and wherein the control circuit is operative (1) to place the relay in the open-circuit condition when the ignition switch is in any of the accessory and off positions, and (2) to place the relay in the closed-circuit condition when the ignition switch is in any of the run and start positions.

12. A method of cranking a cranking motor coupled with an internal combustion engine, the method comprising:

applying a voltage to a relay with a capacitor;

closing said relay in response at least in part to said voltage being applied thereto by said capacitor;

completing an electrical path between a terminal of said capacitor and said cranking motor with said closed relay; and supplying a current to said cranking motor with said capacitor.

13. The method of claim 12 wherein said terminal comprises a first terminal and wherein said electrical path comprises a first electrical path, wherein said capacitor further comprises a second terminal, and further comprising providing a second electrical path between said second terminal of said capacitor and said cranking motor.

14. The method of claim 13 wherein said first terminal is a negative terminal and wherein said second terminal is a positive terminal.

15. The method of claim 12 wherein said applying said voltage to said relay with said capacitor comprises moving a switch from an open position to a closed position and supplying a current to said relay from said capacitor when said switch is moved to said closed position.

16. The method of claim 15 wherein switch comprises an ignition switch, and wherein said open position corresponds to one of an accessory and off position of said ignition switch and wherein said closed position corresponds to one of a run and start positions.

* * * * *